June 18, 1929.  W. C. SMITH  1,717,856
PRESSURE RELIEF PLUG
Filed May 23, 1928
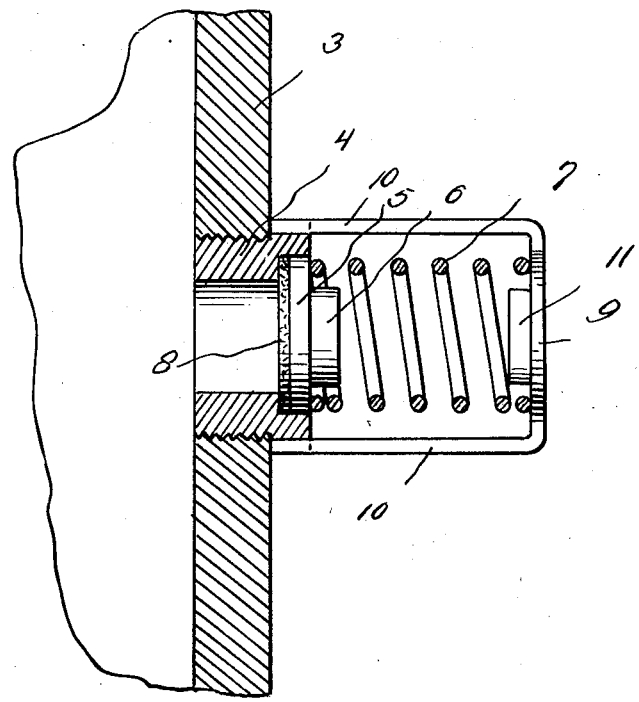
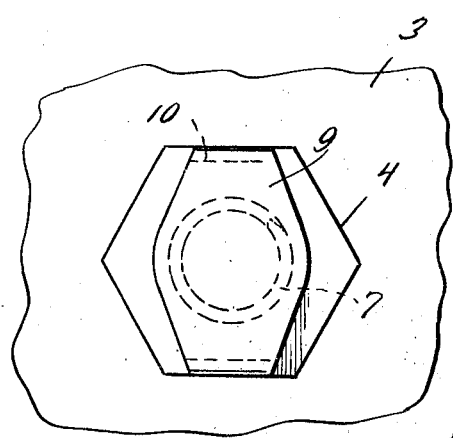
Inventor
W. C. Smith
By Clarence A. O'Brien
Attorney Patented June 18, 1929.

1,717,856

UNITED STATES PATENT OFFICE.

WILLIAM C. SMITH, OF ABILENE, TEXAS.

PRESSURE-RELIEF PLUG.

Application filed May 23, 1928. Serial No. 279,970.

This invention relates to a novel contrivance to be used in connection with the water jacket of an internal combustion engine or the like, and it has more particular reference to automatically operable pressure relieving means.

The invention is adapted more particularly for use in association with engines employing a fluid circulating cooling system. This system of this character is subject to freezing in abnormally cold weather, and the fluid, where it expands, frequently cracks, and bursts, the water jacket.

In view of this, I propose to provide a spring closed pressure release plug which is closed to maintain proper fluid circulation under normal conditions, but which is allowed to open under the expansive action of frozen fluid under abnormal conditions, to relieve pressure and to thereby overcome the liability of breakage of the water jacket.

In the drawings:—

Figure 1 is a view in elevation and section showing the manner in which the attachment is associated with the water jacket.

Fig. 2 is an end view looking from right to left in Fig. 1.

Referring now to the drawings in detail, it will be seen that the reference character 3 designates an ordinary water jacket which in the present instance, is formed in one side or at an appropriate point with a screw threaded opening. Threaded into this opening is a collar, 4 having a portion projecting beyond the exterior and recessed to provide a seat for accommodation of the plug 5. The plug embodies a reduced stub extension 6 surrounded by one end of a coiled spring 7.

The body portion of the plug however, cooperates with a suitable packing element 8, forced firmly against the seat by the action of the spring. The opposite end of the spring bears upon the enlarged bight portion 9 of a substantially U-shaped member. The arms 10 of this member are rigidly fastened to the projecting portion of the collar. Incidentally, this portion of the collar is formed with flat faces to provide for engagement of the jaws of a wrench therewith.

Moreover, the bight portion of the U-shaped member is provided with an extension 11 projecting into the outer end portion of the spring 7.

With the device in position in the screw threaded hole in the water jacket as shown in Fig. 1, it is obvious that when unusual pressure is set up, the spring pressed plug will be unseated to uncover the opening and to allow the fluid to flow out to relieve the water jacket of undue pressure.

It is thought that by considering the description in connection with the drawings, a clear understanding of the construction and operation of the invention will be had. Therefore, a more lengthy description is regarded unnecessary.

Minor changes in shape, size, and rearrangement of parts coming within the field of invention claimed may be resorted to if desired.

Having thus described my invention, what I claim as new is:—

1. As a new product of manufacture, an automatically operable fluid pressure release device for use in association with the water jacket of a fluid circulating system comprising a screw threaded collar having one end formed with a recessed nut, the recess in said nut constituting a seat, a plug including a packing element cooperable with said seat, and spring closing means for the plug.

2. As a new product of manufacture, an automatically operable fluid pressure release device for use in association with the water jacket of a fluid circulating system comprising a screw threaded collar having one end formed with a recessed nut, the recess in said nut constituting a seat, a plug including a packing element cooperable with said seat, spring closing means for the plug, said spring closing means constituting a coiled spring, one end of which is engaged with the plug, together with a substantially U-shaped retaining frame for the spring, the arms of the frame attached to said plug, and the bight portion of the frame being provided with a projection fitting into one end of the coiled spring.

In testimony whereof I affix my signature.

WILLIAM C. SMITH.